United States Patent [19]

Lyssy

[11] Patent Number: 5,916,861
[45] Date of Patent: Jun. 29, 1999

[54] PAINT STRIPPING COMPOSITION METHANOL AND ETHYL 3 ETHOXYPROPIONATE

[76] Inventor: Walter J. Lyssy, 3801 Beckwood, San Antonio, Tex. 78259

[21] Appl. No.: 09/135,270

[22] Filed: Aug. 17, 1998

[51] Int. Cl.⁶ .............................. C11D 7/50; C11D 7/24; C11D 7/26
[52] U.S. Cl. .................. 510/213; 510/202; 510/208; 510/211; 510/404; 510/473; 510/488; 510/505; 510/511
[58] Field of Search ..................... 510/208, 210, 510/211, 213, 201, 202, 404, 473, 488, 505, 511

[56] References Cited

U.S. PATENT DOCUMENTS

| | | | |
|---|---|---|---|
| 4,956,115 | 9/1990 | Van De Mark | 252/170 |
| 4,973,420 | 11/1990 | Van De Mark | 252/170 |
| 4,999,126 | 3/1991 | Meade | 252/162 |
| 5,049,314 | 9/1991 | Short | 510/212 |
| 5,098,592 | 3/1992 | Narayanan et al. | 510/100 |
| 5,468,415 | 11/1995 | Jarema | 252/171 |
| 5,478,491 | 12/1995 | Jarema | 252/171 |

*Primary Examiner*—Ardith Hertzog
*Assistant Examiner*—Dawn Garrett
*Attorney, Agent, or Firm*—Bracewell & Patterson

[57] ABSTRACT

A stripping composition which does not contain methylene chloride or methyl ethyl ketone is comprised of 25% acetone, 16% toluene, 25% ethyl 3 ethoxypropionate, 30% methanol and 4% paraffin wax sealer. The stripping composition may be thickened with Methocel 311. The presence of methanol in the composition greatly enhances the stripping effects of ethyl 3 ethoxypropionate and the thickening effects of Methocel 311. The composition is suitable for application in a number of forms including as a semipaste and as a liquid.

7 Claims, No Drawings

PAINT STRIPPING COMPOSITION METHANOL AND ETHYL 3 ETHOXYPROPIONATE

BACKGROUND OF THE INVENTION

Field of the Invention

This invention relates in general to paint stripping compositions and more particularly to stripping compositions containing solvents that are safer than methylene chloride or methyl ethyl ketone.

Methylene chloride has been the primary solvent for many years in stripping compositions because it will quickly soften a wide range of finishes such as for example, lead paint, oil based paint and latex paint, for removal from a variety of surfaces, such as for example, metal, wood, or concrete. More recently, methyl ethyl ketone has been used in place of methylene chloride to accomplish similar results. Stripping compositions which do not contain either methylene chloride or methyl ethyl ketone are, of course, also known and used. These compositions, however, are usually adapted for specialized purposes and lack the capability of methylene chloride or methyl ethyl ketone to quickly soften a wide range of finishes applied to a wide range of surfaces. Consequently, methylene chloride and methyl ethyl ketone have long been the mainstays of stripping compositions.

One drawback to methylene chloride, however, is that it has been found to be carcinogenic. As a result, its use in stripping compositions, especially in the commercial industrial paint stripping industry, has become unpopular. Similar environmental and safety concerns over the use of methyl ethyl ketone as a solvent are also being raised. As such, utilization of methyl ethyl ketone as a solvent is also discouraged in the paint stripping industry. Furthermore, notwithstanding industrial use, most paint strippers that are available to retail customers, such as home owners, also contain either methylene chloride or methyl ethyl ketone, and eliminating the two solvents from such retail paint strippers would be desirable. Unfortunately, until now there has not been an adequate substitute for methylene chloride or methyl ethyl ketone which is effective to quickly soften the range of finishes described above.

In addition to the health risks posed by the above mentioned solvents, paint strippers which utilize these solvents often contain acids or caustics which may damage the metal or wood surface underlying the paint or other finish being stripped. The acid or caustic ingredients are corrosive and may burn the wood, raise the grain of the wood or discolor the metal surface. Damage to the underlying surface often results because of the tendency of the methylene chloride and methyl ethyl ketone to evaporate and leave behind the less volatile acids and caustics which then crystallize the paint or other finish. Multiple applications of the stripping compositions are then required in order to remove the crystallized paint. These additional applications further increase the likelihood that the underlying surface will be damaged, greatly increase the amount of stripping composition required to complete the stripping process, and thus, greatly increase exposure to these hazardous solvents.

SUMMARY OF THE INVENTION

It is an object of this invention to provide a composition which may be used to quickly strip paint, lacquers and other finishes from wood, metal, concrete and other types of surfaces and which does not utilize methylene chloride or methyl ethyl ketone as a solvent.

It is also an object of this invention to provide a composition for stripping paint, lacquers and other finishes from wood, metal and other types of surfaces which does not contain methylene chloride or methyl ethyl ketone and which reduces the rate of evaporation of the active ingredients of the composition during the stripping process.

It is a further object of this invention to provide an improved stripping composition which does not contain methylene chloride, methyl ethyl ketone or objectionable acids and caustics which cause crystallization of the paint upon evaporation of the stripping composition.

To accomplish these and other related objects of the invention, a stripping composition is prepared from a mixture of ethyl 3 ethoxypropionate (EEP), methanol, acetone, and one or more aromatic hydrocarbons. In the preferred composition, 25% acetone, 16% toluene, 25% EEP, 30% methanol and 4% sealer are mixed together to form a fast acting stripping composition which is effective to strip most types of paint, lacquers, enamels, urethanes, and shellacs. It is desirable to provide the sealer to slow down the rate of evaporation, extending the time of effectiveness of the stripper. The sealer comprises paraffin wax and toluene. The effectiveness of the stripping composition may be further enhanced by adding a thickening agent such as Methocel 311.

DESCRIPTION OF THE PREFERRED EMBODIMENT

The composition of the present invention is directed to a mixture of ethyl 3 ethoxypropionate (EEP), methanol, acetone, and one or more aromatic hydrocarbons. It has been discovered that blending together certain proportions of these ingredients unexpectedly produces an extremely fast acting stripping composition which is effective to quickly strip most types of paints, lacquers, enamels, shellacs, urethanes and other finishes from a range of surfaces.

The specific reasons for the synergistic co-action between these ingredients is not fully understood. EEP by itself is an unsatisfactory stripping agent because it is slow acting and is ineffective when used to strip many types of paints, enamels, lacquers and shellacs. In addition, when in combination with other solvents, it has been found that if the percentage by weight of EEP is too high in relation to the other ingredients, the result will be a decrease in stripping action. Similarly, although it has been recognized that some aromatics such as acetone and toluene may cut some types of light enamels, lacquers and shellacs, they have heretofore been considered unsuitable as stripping agents because they are slow acting. However, it has been found that such aromatics produce desirable results when utilized as base solvents for combination with EEP. In any event, when the solvents are combined in the proportions and in the manner described herein, these components co-act to produce an excellent stripping composition.

The aromatic hydrocarbons which have been found suitable for use in the stripping composition of the present invention include methyl or ethyl substituted aromatic hydrocarbons. Other heavier molecular weight aromatics may also be used but the effectiveness of the final stripping composition diminishes as the heavier molecular weight aromatics are used. The aromatics preferred for use in the stripping formulation are toluene and acetone, which, as mentioned above, are used as based solvents for combination with EEP.

A sealer is also utilized as component of the formula because the presence of a sealer helps to decrease the rate of evaporation of the paint stripper once applied to a surface. As explained above, one of the drawbacks to the prior art is that the paint stripping formulas described therein have a tendency to evaporate before the finish on a surface can be suitably softened. By including a sealer, the evaporation rate is slowed, increasing the effectiveness of the paint stripper. In the preferred embodiment, paraffin wax was found to be the most effective sealer. The sealer was prepared by melting paraffin wax and mixing the melted wax with toluene. In one preferred embodiment, the ratio of paraffin wax to toluene was approximately 1 lb. paraffin per 946 ml of toluene.

The proportions of the components in the stripping composition may be varied and it has been found that suitable stripping compositions are formed from the following formula with the range of ingredients in weight percent of the total compositions:

| | |
|---|---|
| EEP | 15–50% |
| methanol | 10–35% |
| toluene | 10–35% |
| acetone | 10–35% |
| sealer | 1–10% |

Those skilled in the art will understand that the toluene and/or acetone in the above formulation may be replaced by one or more other suitable aromatics such as xylene and other methyl or ethyl substituted aromatics. However, it has been found that acetone and toluene produce the most desirable results.

Furthermore, it has been found that up to a limit, increasing the proportion of EEP in the stripping composition increases the rate at which the final composition strips paint and varnish. Similarly, when the proportions of toluene and/or acetone are increased, the final composition strips enamels, lacquers and shellacs at a faster rate. Thus, it is desirable to maximize the weight percentages of each of the component solvents. While the proportions of the various components may be varied as desired for use in particular applications, a preferred range of ingredients, by weight, for an all-purpose stripping composition is as follows:

| | |
|---|---|
| EEP | 20–30% |
| methanol | 25–35% |
| toluene | 10–20% |
| acetone | 20–30% |
| sealer | 1–10% |

Again, xylene or other methyl or ethyl substituted aromatics may be substituted for the toluene and/or acetone in this formulation.

The particularly preferred composition comprises 23–27% by weight ethyl 3 ethoxypropionate, 27 to 33% by weight methanol, 13 to 18% by weight toluene, 23 to 27% by weight acetone, and 2 to 6% by weight sealer. In one preferred formulation, the optimization of weight percentages for each component solvent yields a solution comprising 25% acetone, 16% toluene, 25% EEP, 30% methanol and 4% sealer. Such a combination unexpectedly produce an excellent, all-purpose stripping composition for quickly stripping paint, lacquer, epoxy, polyurethanes and other products from metal, wood, concrete, plastic and other surfaces. As illustrated by preferred formulation, it has been found that the most desirable results occur when the ratios of the components are maintained within 10–15% of each other.

A semipaste or thickening agent may also be included in the stripping composition to make the final mixture gelatinous for improved adherence to the stripping surface. Although a number of thickening agents exist, such as Ethocel or grade M-5 fumed silica, the most desirable results were achieved with Methocel 311 sold by Dow Chemical Company. Furthermore, it was unexpectedly discovered that the presence of methanol in the formula greatly enhanced the thickening effects of the Methocel 311. In any event, if a thickening agent such as Methocel 311 is added to the stripping composition, in the preferred embodiment the stripping composition may comprise up to approximately 1 to 2% by weight of the total mixture.

The preferred embodiment of the formula has also been found to be conducive to application utilizing spraying devices such as a spray gun. The paint stripper has been observed to atomize well, permitting application of an even coat with a wide pattern. The paint stripper also performed well when the spray pattern was narrowed and the distance to the surface was decreased. In both broad pattern and narrow pattern applications utilizing a spray gun, the paint stripper of the invention resulted in an even coat of paint stripper that skinned over well and stayed wet for a prolonged period of time.

It has also been found quite unexpectedly that the effectiveness of the stripping composition may be enhanced by formulating the composition in an aerosol form with a hydrocarbon propellant comprising approximately 25% of the total mixture.

Although the specific reasons for the improved performance are not generally understood, it has been observed that when one or more thickening agents are added to the stripping composition and mixed with the hydrocarbon propellant, the stripping composition swells slightly when applied to a stripping surface and a film forms on the surface of the stripping composition. Thus, it is believed that there may be a synergistic co-action between the thickening agents and the hydrocarbon propellant which somehow enhances the stripping capability of the composition. The film which forms on the surface is particularly advantageous as it reduces the rate of evaporation of the more volatile components of the composition. It is also believed that the film, in cooperation with the swelling of the composition, causes the composition to penetrate further into the finish being stripped for more effective removal.

The specific solvents and their percentages utilized in the stripping mixture were selected through experimentation with a number of solvents and various weight percentages. Initially, a large group of solvents was identified as being candidates for the stripping mixture, satisfying the criteria that the solvents be less hazardous than methylene chloride or methyl ethyl ketone. Among the solvents investigated were acetone, methyl propyl ketone, toluene, methanol, xylene, dibasic ester, PM acetate and EEP. Due to their common use in the industry, acetone and toluene were selected as base solvents. The remaining solvents were then investigated to identify those that appeared to be the most effective in stripping a variety of finishes on a variety of surfaces. Specifically, various combinations of the solvents were combined in various proportions and applied to surfaces coated with various difficult-to-remove finishes. The results of the investigation indicated that combinations which utilized methyl propyl ketone or xylene as the active ingredient did not perform as well as those combinations that utilized methanol, PM acetate or EEP as the active ingredient.

Focusing on methanol, PM acetate and EEP, these components were then combined with various thickening agents. Among the thickening agents investigated were Ethocel, Methocel 311, both from Dow Chemical, and Fumed Silica, Grade M-5 from Cab-O-Sil. Utilizing acetone, toluene, methanol, PM acetate, dibasic esther and EEP, various paint stripping solutions were created in which the ingredient were of the same approximate percentages by weight. These solutions were then combined with the above mentioned thickeners. No thickening of the solutions combined with Ethocel was observed. Furthermore, only slight thickening was observed when the solutions were combined with Fumed Silica. Furthermore, only slight thickening was observed when Methocel 311 was combined with solutions lacking methanol. However, surprising results were obtained when Methocel 311 was combined with solutions containing methanol. Specifically, where little or no thickening was observed with the other thickeners, Methocel 311 yielded good thickening in each case were methanol was also present in the paint stripping solution.

Utilizing the above described sealer in combination with various solutions containing acetone, toluene, methanol, PM acetate, dibasic ester; and EEP, the most effective component percentages were then investigated. Typically, each solvent that formed a constituent of a solution ranged from between 20–33% by weight of the total solution. Solutions that contained dibasic ester and/or PM acetate alone yielded very ineffective stripping solutions. In addition, combination of EEP with solutions lacking methanol yielded similar results. However, in each instance where EEP and methanol were both present in the stripping solution, the effectiveness of the solution was greatly increased. It was further observed that the presence of dibasic ester and/or PM acetate in a solution containing EEP did not enhance the effectiveness of the stripping solution. In fact, the presence of either dibasic ester or PM acetate in a solution containing EEP and methanol only functioned to decrease the effectiveness of the solution in stripping paint. Thus, although the specific reasons for its effectiveness are not understood, it was discovered that not only does the presence of methanol enhance thickening of the paint stripping solutions, the methanol also enhances the effectiveness of solutions containing EEP.

Based on the results of the above-described experimentation, EEP and methanol, in combination with acetone and toluene were selected as the constituent components of the paint stripper of the invention. It was further discovered that the optimum combination of constituent components resulted when the percentage by weight of each component was approximately the same as the other components. For example, it was observed that when the solution contained over 50% by weight of EEP, the effectiveness of the paint stripper began to decline. Thus, with the constituent components comprising 25% acetone, 16% toluene, 25% EEP, 30% methanol and 4% sealer, the paint stripper of the current invention was applied to a number of various surfaces, including wood, metal, concrete and a rubber membrane. The paint stripper effectively softened coatings such as epoxy, water-based paint, lead-based paint, aircraft paint, oil-based paint, latex-based paint, urethane and anti-graffiti coatings.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth is to be interpreted as illustrative and not in a limiting sense.

What is claimed is:

1. A composition for stripping surface finishes, said composition comprising:

15 to 50 percent by weight ethyl 3 ethoxypropionate;

10 to 35 percent by weight methanol;

10 to 35 percent by weight toluene; and 10 to 35 percent by weight acetone.

2. The composition of claim 1, further including a sealant.

3. The composition of claim 2, wherein said composition comprises 1 to 10 percent by weight sealant.

4. The composition of claim 3, wherein said sealant is paraffin wax.

5. The composition of claim 1, further including a thickening agent.

6. The composition of claim 1, further including a propellant.

7. A composition for stripping surface finishes, said composition comprising:

23 to 27 percent by weight ethyl 3 ethoxypropionate;

27 to 33 percent by weight methanol;

13 to 18 percent by weight toluene;

23 to 27 percent by weight acetone; and 2 to 6 percent by weight sealer.

* * * * *